(12) United States Patent
Rhee

(10) Patent No.: US 10,783,926 B1
(45) Date of Patent: Sep. 22, 2020

(54) EDITING AND TRACKING CHANGES IN VISUAL EFFECTS

(71) Applicant: Steve S Rhee, Los Angeles, CA (US)

(72) Inventor: Steve S Rhee, Los Angeles, CA (US)

( * ) Notice: Subject to any disclaimer, the term of this patent is extended or adjusted under 35 U.S.C. 154(b) by 0 days.

(21) Appl. No.: 16/828,068

(22) Filed: Mar. 24, 2020

(51) Int. Cl.
*H04N 5/93* (2006.01)
*G11B 27/034* (2006.01)
*G11B 27/32* (2006.01)

(52) U.S. Cl.
CPC .......... *G11B 27/034* (2013.01); *G11B 27/323* (2013.01)

(58) Field of Classification Search
CPC ............................ G11B 27/034; G11B 27/323
USPC ......................... 386/278, 280, 281, 282, 286
See application file for complete search history.

(56) References Cited

U.S. PATENT DOCUMENTS

| | | | | |
|---|---|---|---|---|
| 6,137,945 A | * | 10/2000 | McGrath | G06F 3/0481 386/282 |
| 6,342,902 B1 | * | 1/2002 | Harradine | G06F 3/0485 715/716 |
| 2007/0233738 A1 | * | 10/2007 | Weinberger | G06F 16/78 |

* cited by examiner

*Primary Examiner* — Robert Chevalier
(74) *Attorney, Agent, or Firm* — Lamon Patent Services; Cynthia S. Lamon

(57) ABSTRACT

A method for determining edits of a subject video reel, comprising steps of opening an original EDL, reading every line of the original EDL, identifying event names representing each shot and identifying a source file. Each event includes at least a camera time code for the shot length, and a location time code indicating location of the shot in the source file. Locating events and picking up the in and out camera time codes from the shot names, noting shot names and camera times for shots found to have common in and out times, identifying every VFX shot and storing VFX names. Next, the software compares camera times for the shots in the first temporary file with camera times for the same shots in the second temporary file; preparing a result EDL file listing exclusively all VFX shots in which changes were found, and detailing the changes.

6 Claims, 12 Drawing Sheets

Fig. 1

```
TITLE: REEL 04 0605
FCM: NON-DROP FRAME
000001 A016C002_180802_R6LZ                                        V     00:56:28:09 00:56:40:03 04:00:08:00 04:00:19:18
*FROM CLIP NAME: V58-2A*
*ASC_SOP (1.3878 1.3529 1.0660)(-0.0317 -0.0397 -0.0388)(0.9843 0.9435 0.8435)
*ASC_SAT 1.00528
*SOURCE FILE: A016C002_180802_R6LZ
000002 A016C002_180802_R6LZ                                        V     04:25:00:18 04:25:03:10 04:00:19:18 04:00:22:10
*FROM CLIP NAME: 68A--A*
*ASC_SOP (1.1088 1.3739 1.8270)(-0.8503 -0.0557 -0.0512)(0.9966 0.9232 0.8380)
*ASC_SAT 1.00528
*SOURCE FILE: A016C004_180802_R6LZ
000003 A016C002_180802_R6LZ                                        V     00:56:43:17 00:56:46:09 04:00:22:10 04:00:25:02
*FROM CLIP NAME: V58-2A*
*ASC_SOP (1.3878 1.3529 1.0660)(-0.0317 -0.0397 -0.0388)(0.9843 0.9435 0.8435)
*ASC_SAT 1.00528
*SOURCE FILE: A016C002_180802_R6LZ
000004 C038C006_181001_R2EN                                        V     14:06:37:09 12:06:40:04 04:00:25:02 04:00:27:21
*FROM CLIP NAME: V59D-6C*
*ASC_SOP (0.9962 1.0105 1.0270)(-0.0225 -0.0257 -0.0169)(0.9099 0.8587 0.8526)
*ASC_SAT 1.03063
*SOURCE FILE: C038C006_181001_R2EN
000005 A142C002_181002_R6LZ                                        V     09:30:20:10 09:30:23:01 04:00:27:21 04:00:30:12
*FROM CLIP NAME: V55P-1A*
*ASC_SOP (0.3926 1.3067 1.0232)(-0.0213 -0.0256 -0.0175)(0.9109 0.8619 0.8475)
*ASC_SAT 1.03063
*SOURCE FILE: A142C002_181002_R6LZ
000006 C038C010_181001_R2EN                                        V     14:22:00:18 14:22:03:05 04:00:30:12 04:00:32:25
*FROM CLIP NAME: V55E-2C*
*ASC_SOP (1.3022 1.0163 1.0328)(-0.0297 -0.0326 -0.0247)(0.9233 0.8746 0.8593)
*ASC_SAT 1.03063
*SOURCE FILE: C038C010_181001_R2EN
```

*Fig. 2*

```
TITLE:   REEL 04 0611
FCM: NON-DROP FRAME
000001  A016C002_180802_R6LZ                                            00:56:28:09  00:56:40:03  04:00:08:00  04:00:19:18
*FROM CLIP NAME:  V68-2A*
*ASC_SOP (1.0878 1.0529 1.0050)(-0.0317 -0.0397 -0.0383)(0.9843 0.9435 0.8435)
*ASC_SAT 1.00528
*SOURCE FILE: A016C002_180802_R6LZ
000002  A016C004_180802_R6LZ                                            04:25:00:18  04:25:03:10  04:00:19:18  04:00:22:10
*FROM CLIP NAME:  68A-1A*
*ASC_SOP (1.1088 1.0739 1.0270)(-0.0503 -0.0567 -0.0512)(0.9966 0.9232 0.8380)
*ASC_SAT 1.00528
*SOURCE FILE: A016C004_180802_R6LZ
000003  A016C002_180802_R6LZ                                            00:56:43:17  00:56:46:09  04:00:22:10  04:00:25:02
*FROM CLIP NAME:  V68-2A*
*ASC_SOP (1.0878 1.0529 1.0050)(-0.0317 -0.0397 -0.0383)(0.9843 0.9435 0.8435)
*ASC_SAT 1.00528
*SOURCE FILE: A016C002_180802_R6LZ
000004  C038C006_181001_R2EN                                            14:06:37:09  14:06:40:04  04:00:25:02  04:00:27:21
*FROM CLIP NAME:  V69D-6C*
*ASC_SOP (0.9964 1.0105 1.0270)(-0.0225 -0.0267 -0.0169)(0.9099 0.8587 0.8526)
*ASC_SAT 1.09063
*SOURCE FILE: C038C006_181001_R2EN
000005  A142C002_181002_R6LZ                                            09:30:20:10  09:30:23:01  04:00:27:21  04:00:30:12
*FROM CLIP NAME:  V69P-1A*
*ASC_SOP (0.9926 1.0067 1.0232)(-0.0219 -0.0255 -0.0175)(0.9109 0.8619 0.8475)
*ASC_SAT 1.09063
*SOURCE FILE: A142C002_181002_R6LZ
000006  C038C010_181001_R2EN                                            14:22:00:18  14:22:03:05  04:00:30:12  04:00:32:23
*FROM CLIP NAME:  V69E-2C*
*ASC_SOP (1.0022 1.0163 1.0328)(-0.0297 -0.0325 -0.0247)(0.9233 0.8746 0.8593)
*ASC_SAT 1.09063
*SOURCE FILE: C038C010_181001_R2EN
```

*Fig. 3*

```
000366  B527C031_181010_R57B                    V    C    00:12:54:03 00:12:54:16 04:06:46:06 04:06:46:19
*FROM CLIP NAME:  VX70M-3B*
*LOC: 04:06:46:12 WHITE    RF1270
*ASC_SOP (0.9204 0.9440 0.9513)(0.0055 0.0028 0.0003)(0.9376 0.9081 0.9070)
*ASC_SAT 1.09063
*SOURCE FILE: B527C031_181010_R57B
000367  P_RFP1270_LAYOUT_V004.MOV               V    C    01:00:00:00 01:00:00:13 04:06:46:06 04:06:46:19
*FROM CLIP NAME:  P_RFP1270_LAYOUT_V004.MOV
*SOURCE FILE: P_RFP1270_LAYOUT_V004.MOV
000369  A589C027_181011_R71Y                    V    C    00:27:45:07 00:27:46:13 04:06:46:19 04:06:48:01
*FROM CLIP NAME:  VX70H-5A*
*LOC: 04:06:47:10 WHITE  RF1280
*ASC_SOP (0.9700 0.9841 1.0006)(0.0054 0.0024 0.0073)(0.9371 0.9025 0.8716)
*ASC_SAT 1.09063
*SOURCE FILE: A589C027_181011_R71Y
000368  P_RFP1280_LAYOUT_V001.MOV               V    C    01:00:00:05 01:00:01:11 04:06:46:19 04:06:48:01
*FROM CLIP NAME:  P_RFP1280_LAYOUT_V001.MOV
*SOURCE FILE: P_RFP1280_LAYOUT_V001.MOV
000371  P_RFP1220_LAYOUT_V001.MOV               V    C    01:00:01:06 01:00:02:00 04:06:48:01 04:06:48:19
*FROM CLIP NAME:  P_RFP1220_LAYOUT_V001.MOV
*SOURCE FILE: P_RFP1220_LAYOUT_V001.MOV
```

Fig. 4

```
000498  RF1270_V0033.MOV                                                              01:00:00:09  01:00:00:22  04:06:46:06  04:06:46:19
*FROM CLIP NAME:   RF1270_V0033.MOV
*SOURCE FILE: RF1270_V0033.MOV
000501  RF1280_V0052.MOV                                                     V   C    01:00:00:09  01:00:01:03  04:06:46:19  04:06:47:13
*FROM CLIP NAME:   RF1280_V0052.MOV
*SOURCE FILE: RF1280_V0052.MOV
000502  A589C027_181011_R71Y                                                 V   C    00:27:45:07  00:27:46:01  04:06:46:19  04:06:47:13
*FROM CLIP NAME:   VX70H-5A*
*LOC: 04:06:47:10 WHITE   RF1280
*ASC_SOP (0.9700 0.9841 1.0006)(0.0054 0.0024 0.0073)(0.9371 0.9025 0.8716)
*ASC_SAT 1.09063
*SOURCE FILE: A589C027_181011_R71Y
000503  RF1280_V0045.MOV                                                     V   C    01:00:00:09  01:00:01:03  04:06:46:19  04:06:47:13
*FROM CLIP NAME:   RF1280_V0045.MOV
*SOURCE FILE: RF1280_V0045.MOV
000500  P_RFP1280_LAYOUT_V001.MOV                                            V   C    01:00:00:05  01:00:00:23  04:06:46:19  04:06:47:13
*FROM CLIP NAME:   P_RFP1280_LAYOUT_V001.MOV
*SOURCE FILE: P_RFP1280_LAYOUT_V001.MOV
000505  RF1285_V0068.MOV                                                     V   C    01:00:00:22  01:00:01:10  04:06:47:13  04:06:48:01
*FROM CLIP NAME:   RF1285_V0068.MOV
*SOURCE FILE: RF1285_V0068.MOV
000506  A592C007_181012_R71Y                                                 V   C    04:10:55:23  04:10:56:11  04:06:47:13  04:06:48:01
*FROM CLIP NAME:   VX70AD-2A*
*ASC_SOP (1.0031 1.0008 0.9968)(-0.0185 -0.0192 -0.0081)(0.9362 0.9110 0.9054)
*ASC_SAT 1.09063
*SOURCE FILE: A592C007_181012_R71Y
000504  RF1285_V0076.MOV                                                              01:00:00:22  01:00:01:10  04:06:47:13  04:06:48:01
*FROM CLIP NAME:   RF1285_V0076.MOV
*SOURCE FILE: RF1285_V0076.MOV
```

*Fig. 5*

EDITING AND TRACKING CHANGES IN VISUAL EFFECTS

FIELD OF THE INVENTION

The present invention is in the technical area of production of digital video presentations, including special effects, and pertains more particularly to an efficient method of tracking changes in visual effects from one version of a production edit to a later version.

DESCRIPTION OF RELATED ART

Present day editing in film making, involves a Picture Editor assembling the cut of a movie or series and repeatedly cutting to refine the scenes to make them work and appear seamless when viewing. The challenge in creating visual effects in this working environment is that picture editing cuts are made so quickly and often that maintaining the status and working length of a visual effects shot is highly difficult and laborious.

A critically important job in film production in the digital age is that of a Visual Effects Editor. The Visual Effects Editor's main job, which is central to the present invention, is to track every visual effect (VFX) shot in a timeline of a production edit that needs any type of VFX and giving it a shot ID.

The VFX Editor has to know when a shot is cut out, when a new shot is added, when a shot is slipped or rolled (extending or shortening the beginning and end of a VFX shot). All the while, making sure that the shot works with sound and syncs or affects sound. The process of producing the finished product also involves maintaining the shot status for the many more contributors who are VFX vendors and actually work on these VFX shots in high resolution, 2 k or 4 k files.

VFX Editors all have some sort of proprietary database to log and keep records of all shots that are work in progress at the vendors, until they are considered Final, meaning they are ready for feature or television release. These records are usually called Count Sheets or Line Up sheets.

A common method to check and keep re-checking changes in VFX shots in an editing timeline is to gang sync, meaning selecting an old reel and syncing it to a new reel and manually spot checking each VFX shot one by one. Another way is to manually check each shot against the data in the Count Sheets with each timecode from the editing timeline. Both of these methods are extremely time consuming and labor intensive to the point of adding weeks and thousands of dollars to a given editing project.

What is clearly needed is a process that can look at data from one reel and data from a second, later reel, and determine all changes in a rapid and efficient manner, ending in a report detailing all changes.

BRIEF SUMMARY OF THE INVENTION

A method for determining edits made between two versions of a subject video reel, comprising selecting an original edit decision list (EDL) for the subject video reel in an interactive interface displayed by the application executing on the computerized platform, the EDL representing an ordered list of all reel and time code data showing where each video clip is located in the reel. The steps of the method begin with selecting a revised EDL for the subject video reel, to be analyzed for changes to the original EDL for the subject video reel; selecting a folder for storage of a VFX result file from the analysis of the original and the revised EDLs of the subject video reel; and initiating execution of an application for analysis.

The process continues opening the original EDL; reading every line of the original EDL, identifying event names representing each shot and identifying a source file, each event including at least a camera time code for the shot length, and a location time code indicating location of the shot in the source file. Next, locating events and picking up the in and out time codes from the shot names, and identifying those shots in separate events having common in and out location time codes; noting shot names and camera time codes for shots found to have common in and out location times, storing the shot names and camera times in a first temporary file; identifying every VFX shot and storing VFX names and time codes in the first temporary file. Opening the revised EDL file, and searching the revised EDL file for the VFX shots occurs in the next step. The software then notes camera times for the VFX shots in the revised EDL file and noting any new frames and missing frames from the individual shots. An analysis occurs between camera times for the shots in the first temporary file with camera times for the same shots in the second temporary file.

A resulting EDL file is prepared from the information is determined and stored, the result EDL file listing exclusively all VFX shots in which changes were found, detailing the changes determined from the differing camera time codes between the original EDL file and the revised EDL; and then the result EDL report is stored in the folder selected for storage in the interactive interface.

One embodiment teaches that the report, prepared and stored, notes added slates or missing slates in each event where changes were found. Additionally, the report may list all VFX clips by name in order, and changes associated with each VFX clip from the first date and the later date. The report at least details head and tail frame revisions in the VFX clips. An additional embodiment teaches that the VFX clips listed in the in the result EDL report are icons functioning as links to actual locations in the video reel where edits occur, enabling display of that reel portion, wherein once at the actual location, further VFX edits may be made.

BRIEF DESCRIPTION OF THE SEVERAL VIEWS OF THE DRAWINGS

FIG. 1 is and example of an Edit Decision List (EDL).

FIG. 2 is a short portion of an EDL, on a first date.

FIG. 3 is a short portion of the EDL of FIG. 1 at a second, later date.

FIG. 4 is a short portion of the EDL on the first date at a place in the EDL where a VFX shot is identified in the source material and two sequential in and out time codes are the same.

FIG. 5 illustrates a portion of the EDL for the later date where the VFX shot of FIG. 4 appears in the timeline.

DETAILED DESCRIPTION OF THE INVENTION

Figure 6:
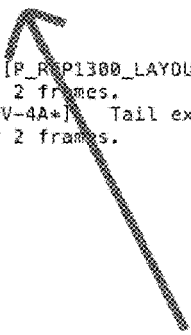
FIG. 6 is a portion of an output log listing all of the VFX files and shot changes in the movie, at a later date.

A unique process in an embodiment of the present invention begins with what is known in the art as an edit decision list (EDL). An EDL is a tool used by artists and digital creators for various reasons and in different ways. An EDL was first created in the 1970's for linear tape based editing. All present day non-linear editing systems use EDLs. An EDL is used in post-production processes of film editing and video editing. An EDL is an ordered list of reel and time code data showing where each video clip can be obtained in order to conform to a final cut.

There are in the video arts several forms of EDLs. In examples in this specification the EDLs are in a format termed in the art File_129, but this is not a limitation in the invention, as the invention in alternative embodiments may well use EDLs in different formats than File_129. The File_129 EDL format is used, for example, in editing software programs, for example, Avid Media™ Composer's List Tool, or 32 character name setting in Adobe Premier™ Pro's EDL export window.

Receiving an EDL as output from a commercial software editing program, as mentioned above, is not a limiting step as the process, as claimed, may be part of applicant's proprietary video editing software or an add-on to any existing video editing tool that incorporates the ability to edit special effects in a video or movie.

Figure 1:
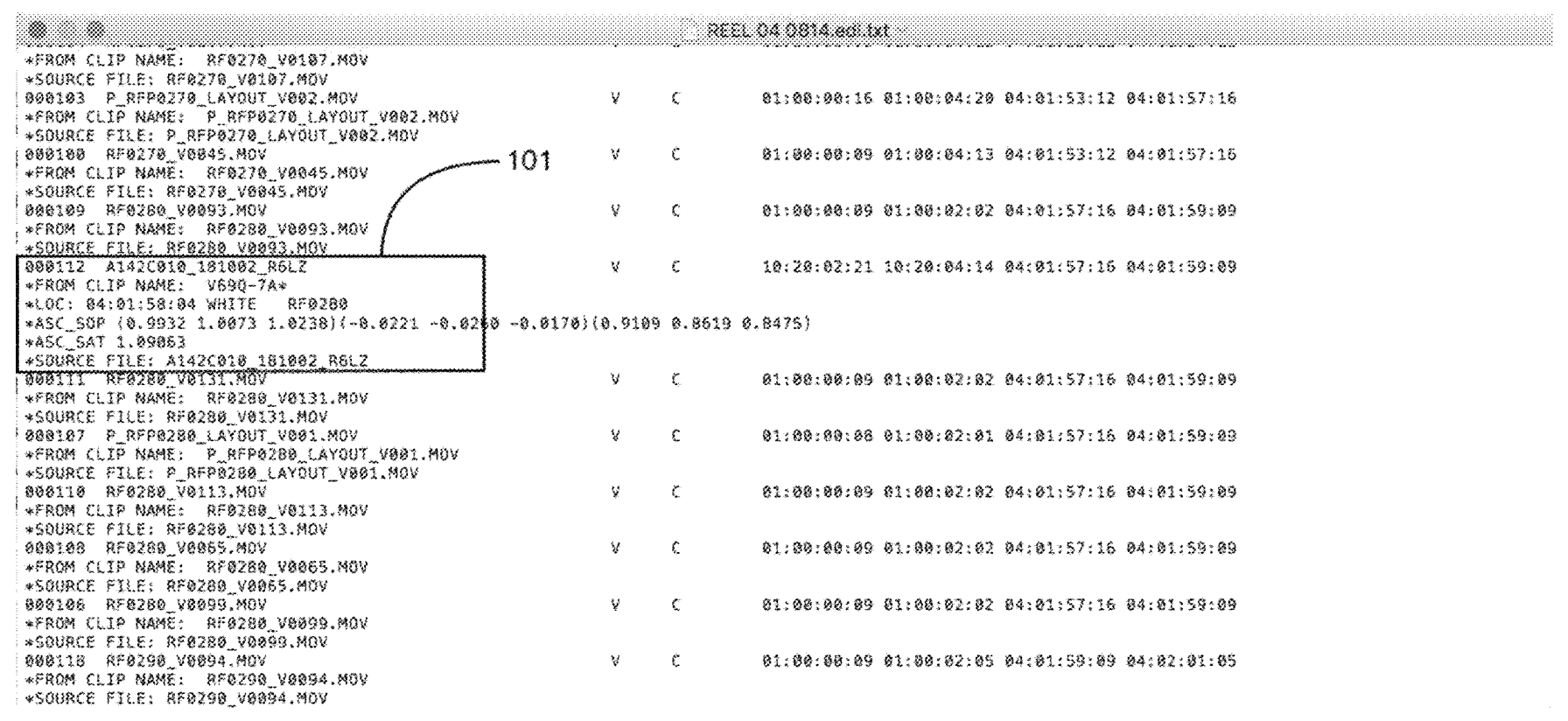

FIG. 1 is a screenshot of an example of a short portion of an EDL in the format called File_129. This format keeps the original camera source filename intact (because they can be so many characters). The EDL shown in FIG. 1 is from a Reel 4 on a date of August 14, hence REEL 04 0814 in this format heading the screenshot in FIG. 1.

Referring to area 101 in FIG. 1 attention is drawn to the line item beginning with 000112. This is an event number in the EDL. All EDLs have event numbers listed. When there are numerous tracks on a timeline stacked vertically the event numbers can and often will shift in the EDL, even when exporting the same EDL twice without any changes. It may be noted, for example, that Event No. 000111 is listed after Event No. 000112. Nevertheless, all of the event numbers will be listed in the EDL, just not always in the same order.

Referring again to area 101 in FIG. 1 Event No. 000112 has six lines. In the first line from the top of the area defined by 101, linearly following the Event No. 000112, the designation A142C010_181002_R6LZ on the same line designates a source file. Note also that the source file designation is repeated on the last of the six lines associated with Event No. 000112. The camera department assigns this source number for each take, shot or filming of a of a specific scene. The source file designation is embedded into metadata in the shot and is also visible in dailies as a watermark. Dailies, in this embodiment, refers to raw footage shot during the production of a motion picture (also known as rushes or daily rushes, referring to the speed with which they must be prepared). The shot may be digitally recorded or recorded on tape. The source file is a unique identifier (serial number) to each clip containing letters and numbers.

The second line of Event No. 000112 reads: *FROM CLIP NAME V69Q-7A*. This is what the clip is called when first or originally filmed. The Clip Name is also known as a slate, providing a scene number and take number of the clip. This example would fall under scene 69 and would be the 7$^{th}$ take.

The next line reads *LOC: 04:01:58:04 WHITE RF0280. The LOC is location where a marker is placed manually to add a VFX shot, in this case RF0280. White—was just the color of the marker used to tag the VFX shot name at the time. Not every event will have a VFX shot.

The next line is ASC_SOP, followed by a series of numbers in parentheses, which are values that designate color. Once the raw (original) digital files in the camera have been graded a certain color for what they call dailies, the values go in the EDL. The color values and the next line ASC_SAT are not pertinent to the present invention.

Referring now to events both above and below Event No. 000112, there are seen clip names RF0280_V0093.MOV, and RF0280_V0131.MOV. These are versions of shots that vendors submitted as work in progress that have been brought into the EDL. Thus, the editing software using File_129 creates shot names and source files, which are named the same.

Following to the right on the first line of Event No. 000112, there are four time code numbers, in sequence [10:20:02:21] [10:20:04:14] [04:01:57:16] and [04:01:59:09]. The first two of the four are in and out times, respectively, recorded for that specific clip recorded by the camera. The second two time codes are the in and out times for this clip in the timeline of the movie. The timeline of the movie may not only reflect time segments taken up by the shot, but may also denote position or place of the shot in the movie recording. FIG. 1 is presented simply as an example of an EDL in the context of the present invention, to explain the naming conventions.

FIG. 2 is a short portion at the beginning of a very much longer EDL from a beginning of cut of a movie, Reel 4, dated 0605 (Title). FIG. 3 is a short portion of an EDL for the same reel, Reel 4 at a later date 0611. The time difference of several days from 0605 to 0611 makes it virtually certain that picture editing has occurred between the two versions of Reel 4. Referring to FIG. 2, the first line is the title: Reel 4, and date, 0605, and FIG. 3 the first line is the title Reel 4, and date 0611.

It has occurred to the inventor in considering the EDLs of FIG. 2 and FIG. 3 that because the editing software lists events in a vertical stack, one might locate instances in an EDL where two events occur in the same time period in the reel, and note whether there is a VFX clip in the first event of sequential time codes in the timeline of the reel. This may be done by reading the in and out times for an event in the time line of the reel, which are the time entries in the third and fourth time lines for the event, and noting if there is a VFX clip in the event. Then the in and out time codes of the clips in the original may be compared to the same clips in the EDL at a later time, while noting new clips and omissions. The result can determine just the places or locations in the reel where actual changes have been made, extremely valuable information.

FIG. 4 is a short portion of the EDL on the first date, 0605 of FIG. 2, at a place in the EDL hundreds of entries later where in and out location time codes for sequentially listed, separate events are identified as the same, and a VFX clip is identified in the source material. A box 401 encloses where the in and out location time codes are the same for sequential events 000369 and 000368. A box 402 indicates the VFX name, and a dotted box 403 indicates the in and out camera time codes for the location and length of the VFX clip, itself, in the source file.

FIG. 5 illustrates a portion of the EDL for the later date, 0611, where VFX RF1280 is located and appears in the timeline. A box 501 encloses all the data pertinent to VFX RF 1280 in this later EDL, encompassing four events, 000501, 000502, 000503 and 000500. Referring back to FIG. 3 it may be seen that the time codes for VFX RF1280 clip are 00:27:45:07 to 00:27:46:13. The codes in the later EDL of FIG. 5, underlined as elements 502 are 00:27:45:07 to 00:27:46:01. Clearly the clip in this portion has been truncated by 12 frames, indicated by the difference between 0027:46:13 and 00:27:46:01. The time codes underlined as elements 503 in the later EDL show that this clip has also been truncated. The data in the later EDL also shows that two new clips have been added between the earlier and the later EDL. These are indicated by elements 504 and 505.

In an embodiment of the present invention the inventor has provided a system performed by software executing algorithms and performing an analysis on data in the EDLs wherein a first EDL is loaded and a second, later EDL is also loaded. Every instance in the first EDL where sequential time codes of the movie timeline are uniform and associated with a VFX by name, the portion of the later EDL in which every instance of the same VFX is noted is accessed, and the time codes for the VFX are compared, to determine if any change has been made.

FIG. 6 is a portion of an output log of applicant's invention listing all of the VFX files detected and captured in the reel. It should be understood that the EDL files and the EDL of FIG. 5 are very long files, including up to thousands of entries and only a portion may be shown in a single figure. Referring again to FIG. 6 a highlighted portion also indicated by an arrow, shows expanded data regarding RF1280, such as discussed above. Two slates have been added in the revised file. For the clip A589C027_181011_R71Y: [VX70H-5A*] the tail has been reduced by 12 frames. In total VFX RF1280 is reduced by 12 frames. P_RFP1280_LAYOUT_V001.MOV clip: [P_RFP1280_Layout_V001.MOV} Tail reduced by 12 frames. In total RF1280 is reduced by 12 frames. This result is extremely valuable information for the VFX editor and VFX department, and in an embodiment of the present invention is obtained in moments instead of hours and days as in the prior art.

Now considering this new and unique process on a macro scale, where there may several hundred shots to several thousand in one reel alone, the impact of noting only the VFX shots that have actually changed in the edit indicated by the later EDL is highly significant and impactful. Every single one of the VFX shots have numerous artists working on them at vendor shops to get to them to Final status, meaning theatrically ready. Typically, it takes tremendous amounts of time and energy, which equates to a lot of money, to finish the VFX shots. If this efficiency of the edit in terms of VFX can be exacted to this degree of applicant's invention, this can be beneficial to the entire production as a whole in the movie making process. More movies will be made because it will be much faster and cheaper to edit a film and get it to market.

Figure 7A:
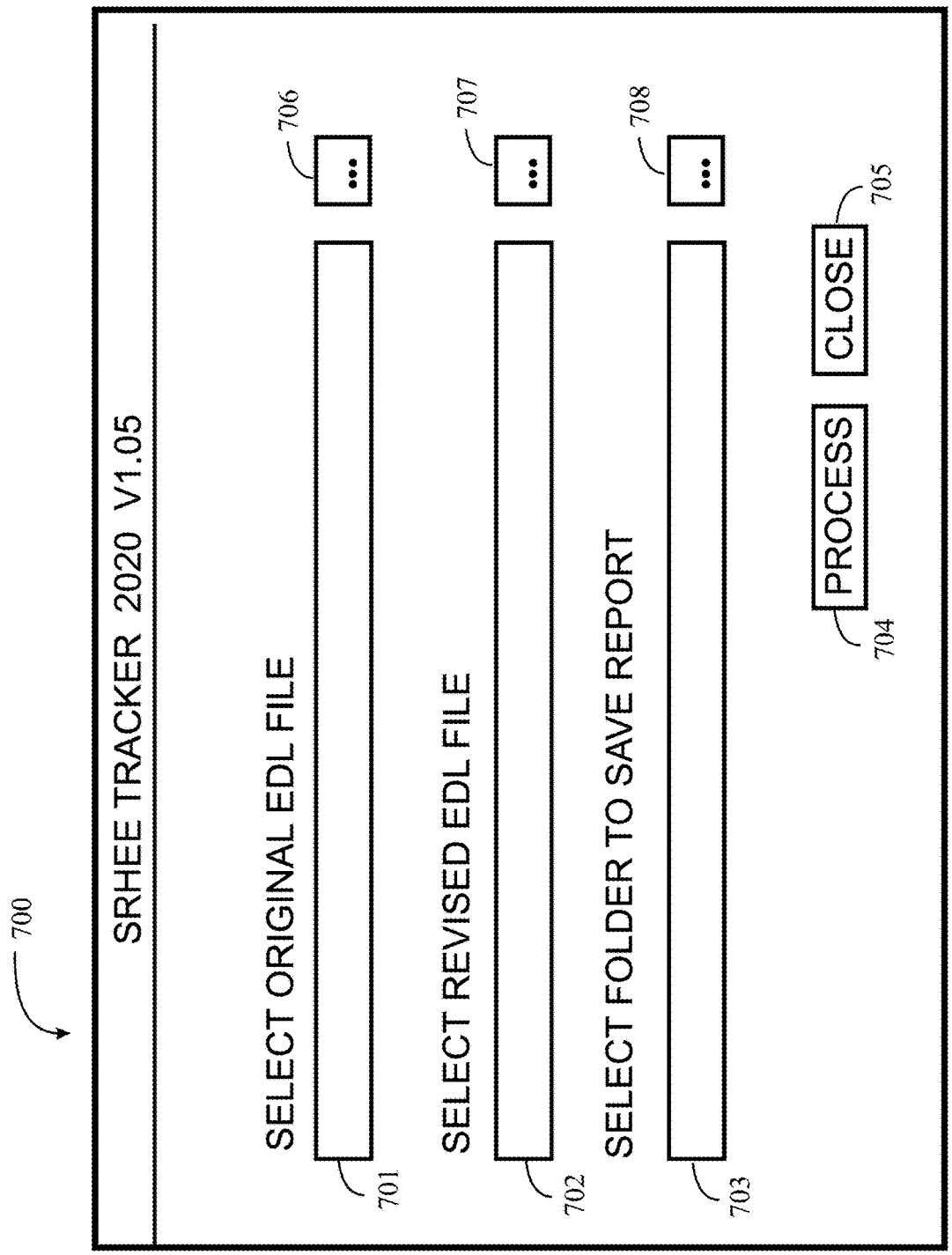
FIG. 7A is an illustration of a user interface in an embodiment of the invention.

FIG. 7A is an illustration of a user interface 700 in an embodiment of the invention. A Tracker Application according to an embodiment of the invention may be saved in a non-transitory data repository, and booted to execute, which may result in the user interface of FIG. 8A being displayed on a display monitor of a computerized device (FIG. 10) in use by, in one instance, a VFX editor. There may be a log-in procedure for the VFX editor to enter perhaps a username and a password to log in to the application.

Figure 10:
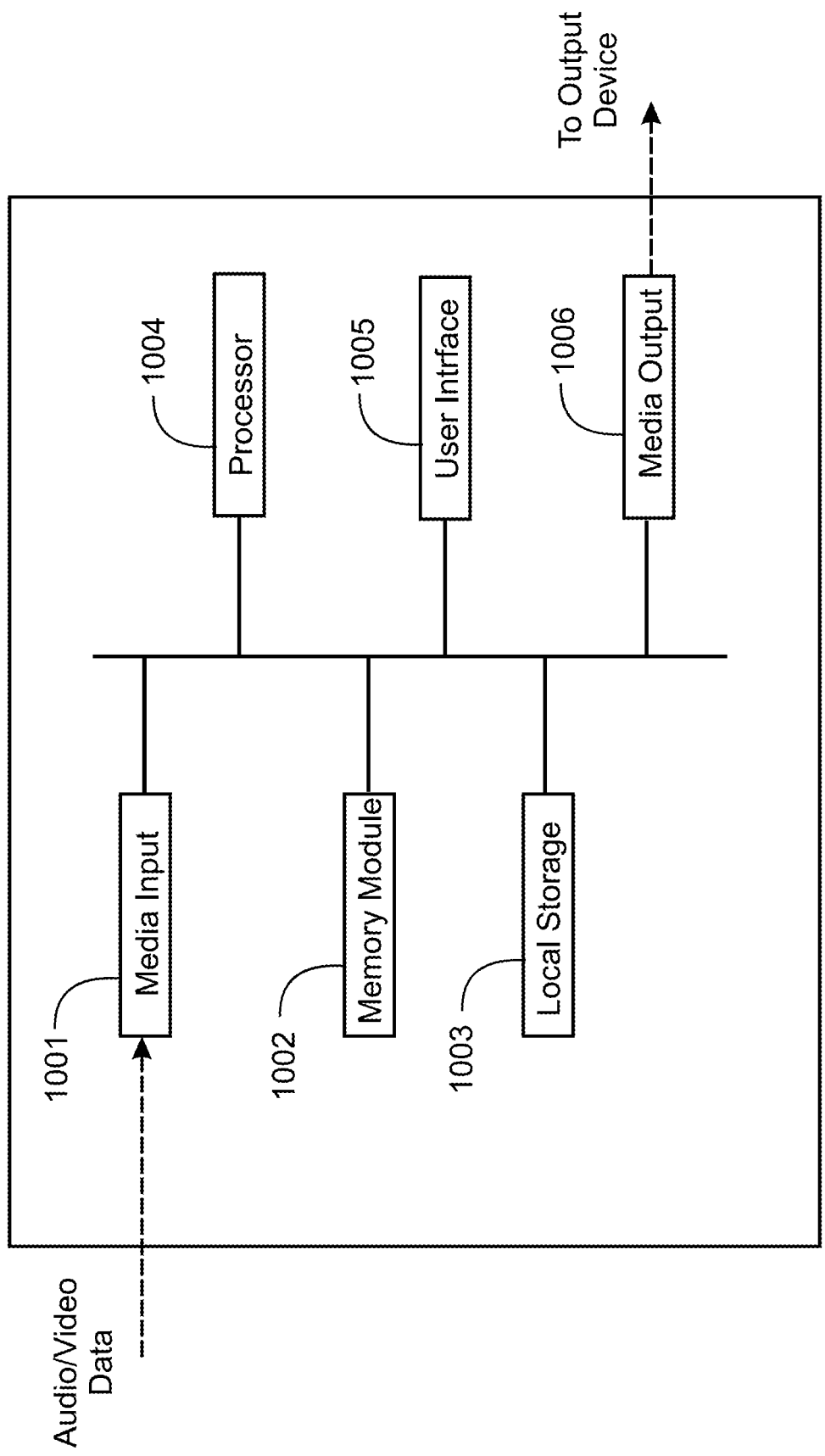
FIG. 10 is a functional layout of a computerized device dedicated to performing the unique process of the invention.

Interface 700 may be presented on a display device as output to the computerized device of FIG. 10. Interface 700 is headed in this example SRHEE TRACKER 2020 v1.05. This is an arbitrary name in this example, indicating a version of an executable application in an embodiment of the invention. Input Field 701 enables the VFX Editor logged in to select an original EDL file for analysis to a later revised file. If the VFX Editor knows the name of a file of interest, she may enter the name in the input field. If the name is not known, button 706 is a Browse link, which may redirect the editor to a display of icons indicating individual ones of EDL files at different dates. Such as displayed is illustrated in FIG. 7B.

In one embodiment there may be a search function enabling the user to enter search criteria to find EDL files of interest. FIG. 7B illustrates a folder 709 with a plurality of interactive icons 710(a-n), each of which represents a single EDL file which may be of interest to an editor to compare to a later EDL file. These EDL files are named in the convention of the File_129 protocol described above and used in examples in this specification. Each has therefore a Reel Number and a date. Note that the files described above, these being Reel 04 0605.edl and Reel 04 0611.edl are shown as candidate EDLs in FIG. 7B. The inventor notes that the EDL files may incorporate other file extensions as .edl is not a limiting feature of the invention. The user may position the pointer in the display over an icon, and a left click, for example, will enter that file name in the input field of FIG. 7A. In some embodiments the system may be configured to order the icons in the display in ascending or descending order of dates.

Figure 7B:
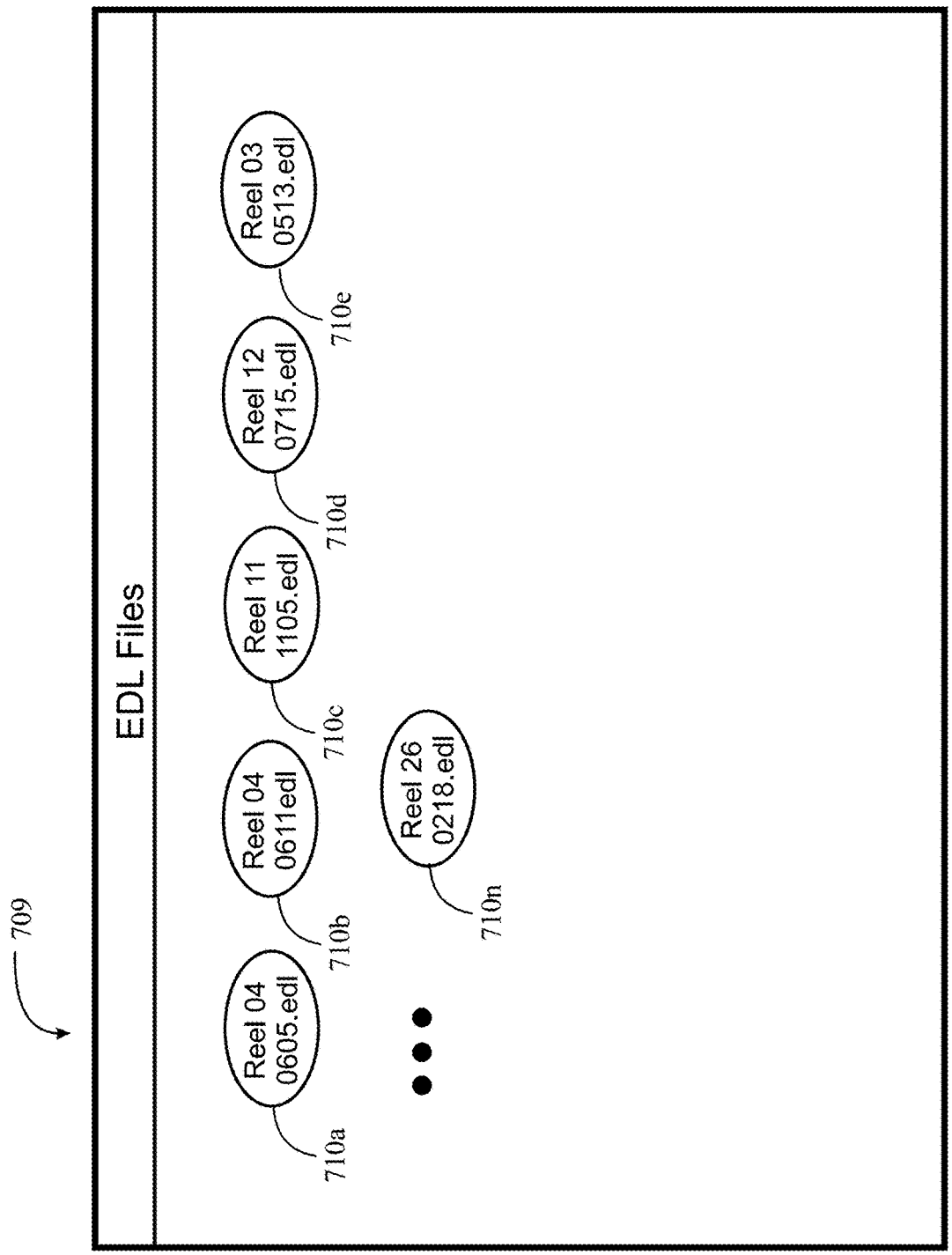
FIG. 7B illustrates a display of icons representing EDL files for different reels on different dates.

After selecting a first file, as the original file in a analysis, the user, in this case perhaps the VFX editor, may activate the "revised file" field and select a second EDL file from the display of FIG. 7B. Typically the revised EDL file will be of the same Reel number, and the date will be soon after the date of the first EDL file. The example above using Reel 04 0605.edl and Reel 04 0611.edl is a case in point, although the separation of six days in the dates is not a limitation. The separation could be more or less than that indicated in these example files.

Figure 7C:
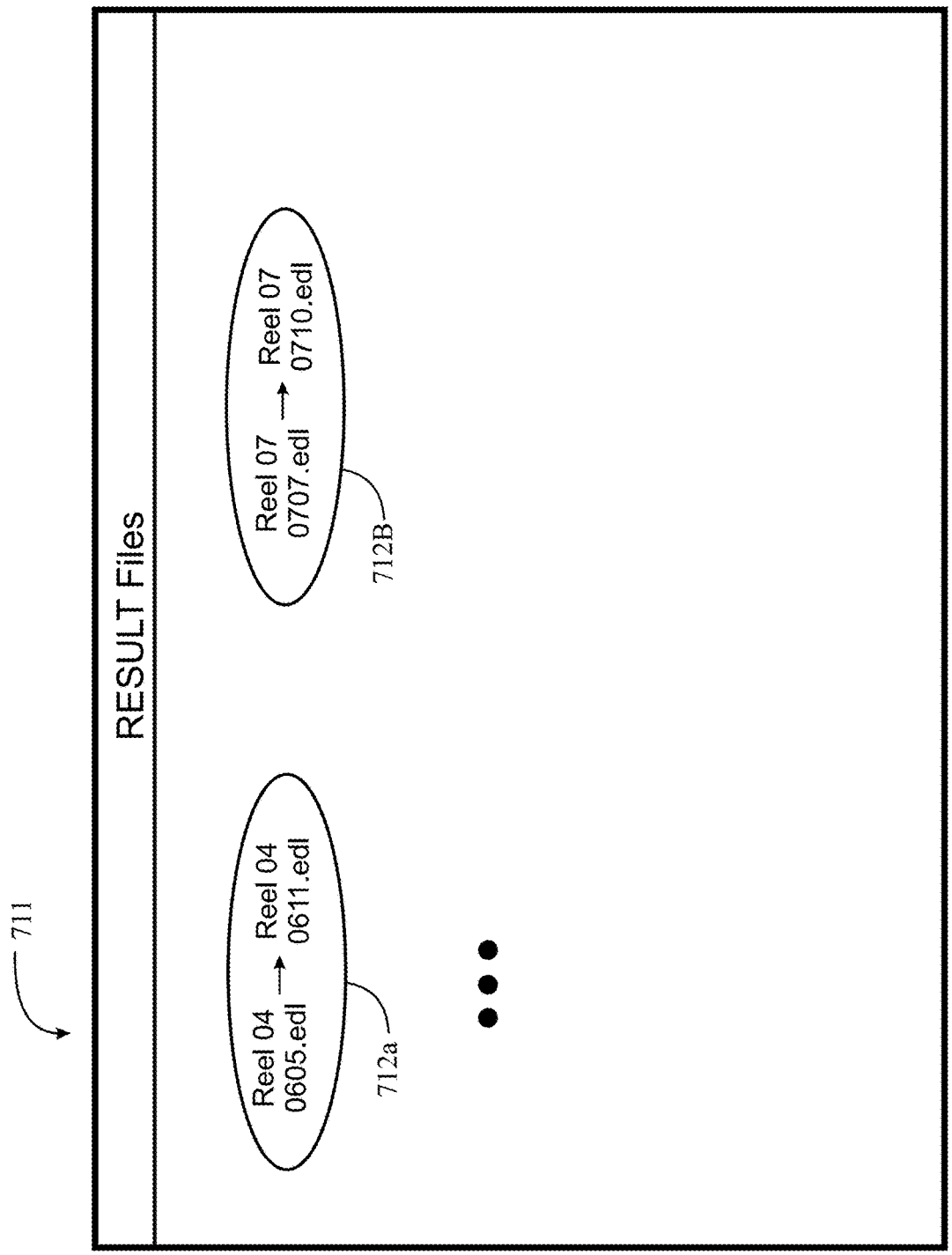
FIG. 7C illustrates a display of icons representing changes made in a reel between two different dates.

Returning to FIG. 7A, once the "original" and the "revised" EDL file are chosen, the user may activate the "select folder" input field to direct the result of the upcoming analysis to be saved in a particular folder. FIG. 7C is a display for a folder 711 named "Result Files", which is an example of one such folder where results of the analysis in embodiments of the invention may be saved. In the folder illustrated in FIG. 7C there are two result files 712a and 712b indicated by interactive icons. File 712a is labeled to indicate that it is a result file for an analysis of Reel 04 0605.edl and Reel 04 0611.edl. This designation is arbitrary in this example, and may be indicated in a variety of ways. File 712b is a result of analysis of Reel 07 0707.edl and Reel 07 0710.edl, a span of three days, which should assure that significant edits may have been made.

Another beneficial function of the VFX result files shown and described in FIGS. 6 and 7C, is that each VFX label listed in the result file functions as a link to the location in the actual recording being edited of where the edited slate is or was (if deleted). For example an input device, such as a cursor or other manner of selecting an individual slate RF1280, or RF1285 redirects the screen to actually locate, display and play the location of the video recording where the slate edit is located. This process greatly reduces additional processes to exit the Tracker software and access back to the editing software to view the edit that is indicated. At this point corrections or further edits may occur.

Figure 8:
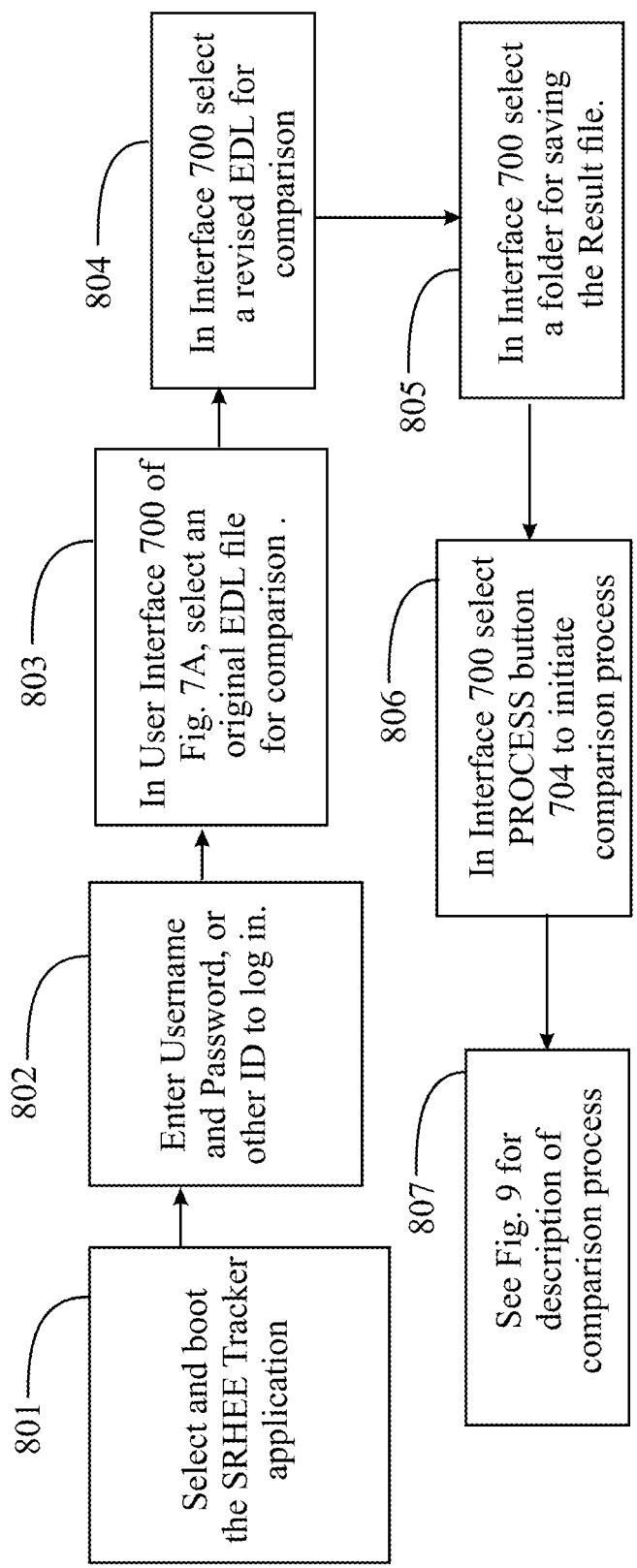
FIG. 8 is a flow diagram of a unique process in an embodiment of the invention.

FIG. 8 is an exemplary flow diagram illustrating steps in logging in and booting an exemplary Tracker application in an embodiment of the invention. In practice the application may be executed on a general purpose computer or workstation using a conventional operating system and different versions of the Tracker application may be configured to execute on different platforms with different operating systems. The step-by-step process is the same or very similar regardless of the platform.

At step 801 a user selects and boots the SRHEE Tracker on the platform in use, which typically may display a log-in interface. At step 802 the user enters Username and Password, or other ID required to logging in to the program. At step 803 the user selects an original EDL file to be used in an analysis to discover changes that may be made from one date to another in a particular reel. At step 804 the user selects a revised EDL file for the analysis. At step 805 the user selects a folder for storage of a Result file of the analysis. At step 806 the user initiates the analysis process by selecting the PROCESS button in the interface of FIG. 7A. Step 807 indicates that details of the steps performed by algorithms in the process are indicated in FIG. 9.

Figure 9:
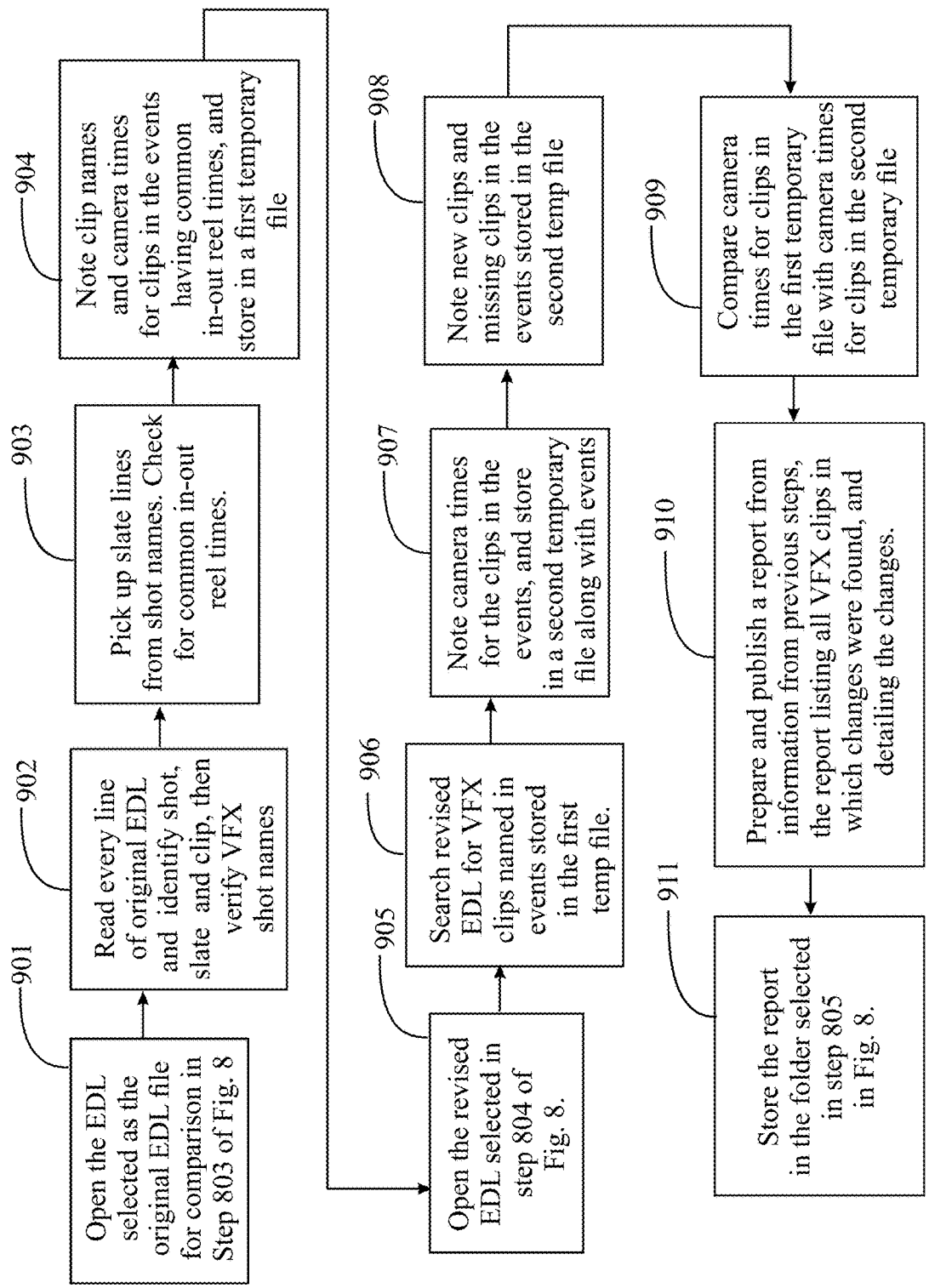
FIG. 9 is a flow diagram of steps in a unique process of the invention.

FIG. 9 is an exemplary flow diagram of steps in performed by algorithms in a analysis process to determine changes in VFX clips from one date to another in a reel. At step 901 the process opens the EDL selected as the original EDL file for analysis in Step 803 of FIG. 8. At step 902 the process reads every line in the original EDL and identifies shot, slate and clip, and verifies VFX shot names. At step 903 the process picks up slate lines from shot names and checks for common in-out reel times. At step 904 the process notes clip names and camera times for clips in the events having common in-out reel times, and stores these in a first temporary file.

Continuing in FIG. 9, the process, at step 905 opens the revised EDL file selected at step 804 in FIG. 8. At step 906 the revised EDL file is searched for VFX clips named in events stored in the first temporary file. At step 907 the process notes camera times for the clips in the events, and stores these in a second temporary file, associated with the events. At step 908 the process notes any new clips, and any missing clips, in the events stored in the second temporary file. At step 909 the process compares camera times for clips in the first temporary file with camera times for the same clips in the second temporary file. At step 910 the process prepares a report from the information discovered and stored in the previous steps, listing all VFX clips in which changes were found and details of the changes. At step 911 the report is stored in the folder selected for same in step 805 of FIG. 8.

Another embodiment implements a specific computerized device enabled to store and execute the software performing the method of the invention. FIG. 10 provides a computerized device having a media input port 1001. Media input port may include an application programming interface or API enabled to exchange information with the video editing software and directly input EDLs from the editing software into the Tracker software of applicant's invention. The computerized device may include a monitor which displays the screen shots and processes shown and taught in this description.

The skilled person will understand that the order of searches, the temporary storage of information, and the nature of the results file may all be done in a different order and in a variety of ways without departing from the scope of the invention. The skilled person will also understand that the embodiments described herein are all exemplary and may be altered to some extent without departing from the scope of the invention. The scope of the invention is limited only by the claims.

I claim:

1. A method for determining edits made between two versions of a subject video reel, comprising:
   logging into an application configured for comparing versions of the subject video reel, the application executing on a computerized platform from a non-transitory medium;
   selecting an original edit decision list (EDL) for the subject video reel in an interactive interface displayed by the application executing on the computerized platform, the EDL representing an ordered list of all reel and time code data showing where each video clip is located in the reel;
   selecting a revised EDL for the subject video reel, to be analyzed for changes to the original EDL for the subject video reel;
   selecting a folder for storage of a VFX result file from the analysis of the original and the revised EDLs of the subject video reel; and
   initiating execution of the application for analysis, wherein the application executes, comprising steps of:
   opening the original EDL;
   reading every line of the original EDL, identifying event names representing each shot and identifying a source file, each event including at least a camera time code for the shot length, and a location time code indicating location of the shot in the source file;
   locating events and picking up the in and out time codes from the shot names, and identifying those shots in separate events having common in and out location time codes;
   noting shot names and camera time codes for shots found to have common in and out location times, storing the shot names and camera times in a first temporary file;
   identifying every VFX shot and storing VFX names and time codes in the first temporary file;
   opening the revised EDL file, and searching the revised EDL file for the VFX shots;
   noting camera times for the VFX shots in the revised EDL file and noting any new frames and missing frames from the individual shots;
   comparing camera times for the shots in the first temporary file with camera times for the same shots in the second temporary file;
   preparing a result EDL file from the information determined and stored, the result EDL file listing exclusively all VFX shots in which changes were found, detailing the changes determined from the differing camera time codes between the original EDL file and the revised EDL; and
   storing the result EDL report in the folder selected for storage in the interactive interface.

2. The method of claim 1 wherein changes in the report are prepared and stored as notes, added slates or missing slates in each event where changes were found.

3. The method of claim 1 wherein the report lists all VFX clips by name in order, and changes associated with each VFX clip from the first date and the later date.

4. The method of claim 3 wherein the report details head and tail frame revisions in the VFX clips.

5. The method of claim 3, wherein the VFX names representing VFX clips listed in the in the result EDL report are icons functioning as links to actual locations in the video reel where edits occur, enabling display of that reel portion.

6. The method of claim 5, wherein once at the actual location, further VFX edits may be made.

* * * * *